United States Patent

Singer

[11] 3,923,870
[45] Dec. 2, 1975

[54] URETHANES OF 1-HALOGEN SUBSTITUTED ALKYNES

[75] Inventor: William Singer, Teaneck, N.J.

[73] Assignee: Troy Chemical Corporation, Newark, N.J.

[22] Filed: July 11, 1973

[21] Appl. No.: 378,089

[52] U.S. Cl............ 260/482 C; 106/15; 260/468 E; 260/471 C; 260/482 B; 260/633; 424/300
[51] Int. Cl.² .................................. C07C 125/06
[58] Field of Search .............................. 260/482 C

[56] References Cited
UNITED STATES PATENTS
3,226,426  12/1965  Hopkins et al............... 260/471 C FOREIGN PATENTS OR APPLICATIONS
627,647  9/1961  Canada........................ 260/482 C Primary Examiner—James A. Patten
Assistant Examiner—Paul J. Killos
Attorney, Agent, or Firm—E. Janet Berry; Lawrence Rosen

[57] ABSTRACT

Novel urethane compounds, which are derivatives of 1-halogen substituted lower molecular weight alkynes having the formula

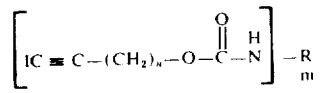

wherein R is a substituted or unsubstituted alkyl, aryl, or alkylaryl group having from one to not more than 20 carbon atoms and having from one to three linkages corresponding to $m$, and $m$ and $n$ are whole number integers between 1 and 3 and may be the same or different. These compounds have shown great fungicidal activity and particularly when used in surface coating compositions such as paint formulations.

11 Claims, No Drawings

URETHANES OF 1-HALOGEN SUBSTITUTED ALKYNES

This invention is concerned with a new class of urethane compounds, and more particularly is concerned with certain members of the group which have been found to have outstanding fungicidal activity. These new compounds may be considered to be derivatives of 1-iodo-substituted lower alkynes having the generic formula:

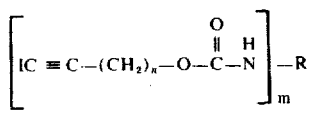

wherein R is selected from the group consisting of substituted and unsubstituted alkyl, aryl and alkylaryl groups having from one to not more than 20 carbon atoms and having from one to three linkages corresponding to $m$, and $m$ and $n$ are whole number integers between 1 and 3 and may be the same or different.

The most effective and efficient class of fungicides now known are generally considered to be the organically substituted mercury compounds. They have been particularly valuable because they control attack by a wide spectrum of micro organisms, may be used at low concentration, and have considerable permanence when this characteristic is desirable (as in surface coatings). However, the reputation of these compounds has deteriorated recently because of toxic and environmental hazards, and they are being eliminated or phased out as commercial fungicides.

Other fungicides which have been developed and which have been placed on the market from time to time as mercurial substitutes are listed below, but none of these has proved to be entirely satisfactory.

a. Captan — not stable to hydrolysis, particularly in alkaline systems.

b. trans, di-n-propyl-1,2-ethene — is not stable in aqueous systems.

c. 4-methyl sulfonyl tetrachloropyridine — is not stable in alkaline systems.

d. 2-(4 Thiazolyl)-benzimidazole — is relatively ineffective against alternaria sp. — a prevelant organism in the south, and is expensive.

e. p-Cl (or methyl) phenyl diiodomethyl sulfone — causes yellowing, is ineffective in oil-based systems, and is relatively ineffective against weathering.

f. octylisothiazolone — is relatively ineffective against the weather, requires zinc oxide as a synergist, and is expensive.

Certain halogenated acetylenic alcohols and derivatives therefrom have been described but the urethane compounds which are the subject of this invention are novel and are not taught in the art either as fungicides or otherwise.

U.S. Pat. No. 1,841,768 teaches the preparation of chloro and bromo substituted ethine carbinols. They are disclosed as pharmaceutically valuable and for therapeutic use. U.S. Pat. No. 2,989,568 also relates to the preparation of chloro and bromo-substituted acetylenic alcohols. The compounds are described as useful as corrosion inhibitors and inhibitors for plating baths. Generally speaking, these two patents described tertiary alcohols and teach only chloro and bromo substituted compounds. No iodo compounds are disclosed.

U.S. Pat. No. 3,203,986 discloses carbamates (urethanes) of 4-halo-2-butynes. In these compounds, the halogen is located on one carbon atom removed from the carbon atom holding the acetylenic bond. The compounds are described as having biocidal properties including several different effects, such as plant growth regulatory and herbicidal activities. These compounds have a basic structure which is entirely different chemically from that of the compounds of the invention in that the halogen is separated from the acetylenic carbon by a methylene grouping.

U.S. Pat. No. 2,791,603 is directed to carbamates (urethanes) of tertiary acetylenic carbinols useful as anti-convulsants. The compounds of the invention are not tertiary compounds nor is it intended to include them as part of the invention.

U.S. Pat. No. 3,436,402 teaches certain halogenated carbamates of diaryl substituted alkynes. The invention does not contemplate compounds having aryl groups in these positions. Furthermore, this reference does not teach any iodo substituted compounds similar to those of the invention.

The novel compounds of this invention are most conveniently prepared by (1) iodinating the appropriate acetylenic alcohol, then (2) carrying out a subsequent reaction with an isocyanate to form the corresponding urethane. These reactions are not novel and may be represented to proceed typically as follows:

Step (1): 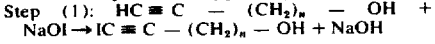
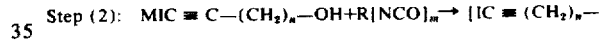

Step (2): 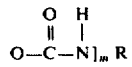

In these formulas and equations, R, $n$, and $m$ have the same meanings as set forth above.

If the R group has more than one replaceable linkage, i.e., R is a diisocyanate or triisocyanate, then it is possible to form urethane compounds having up to three imino linkages. It is intended that these compounds are also a part of this invention.

Step (1), i.e., a halogenation of alkynes, is a well known reaction. The iodination is conveniently carried out with sodium hypochlorite and an alkali metal iodide. A small molar excess of sodium or potassium iodide, previously dissolved in water, is added to the reaction mixture prior to the addition of hypochlorite. Isolation of the product is conveniently carried out by extraction with ether. The ether extract so obtained is dried with anhydrous sodium sulfate, and the ether is allowed to evaporate at room temperature. The residue constitutes the iodo intermediate, which may be then reacted further with an isocyanate as indicated in Step (2) above to yield the final product of a urethane.

Step (2), the reaction with an isocyanate is also known and is carried out by dissolving the iodinated acetylenic alcohol prepared as indicated above into an excess of dry tetrahydrofuran. A slight stoichiometric excess of the isocyanate is added, followed by small amounts of triethylamine and dibutyl tin dilaurate. The complete reaction mixture is placed in a reaction jar, tightly capped, and heated at 50°–60° for 24 hours. At the end of that period, the volatiles are permitted to evaporate at room temperature. The residue which is obtained is the urethane product.

As desired, the urethane compounds may be purified using a suitable solvent and recovery.

For use as a fungicide, complete purification of the urethanes is not necessary. Some of the products are solids and some are liquids, frequently oils. Haloacetylene compounds are somewhat unstable, and the products obtained may contain some decomposition or secondary reaction products. These do not detract from their fungicidal efficacy, but such impurities do make difficult the obtaining of very precise physical constants. However, analytical tests have yielded results consistent with the indicated structures.

It is not intended to limit the preparation of the compounds to the exact process or steps above described. Any equivalent procedure which yields the same end products may of course be used.

These compounds have a number of advantages over those heretofore available as fungicides. The urethanes are excellent fungicides in all types of paints. They are hydrolytically stable and may be used in both latex and oil based systems. They are soluble in many solvents, and may therefore readily be diluted for convenience or ease of use. Their compatibility, low color, and efficiency make then advantageous for use as fungicides in plastics, and for impregnation into wood, leather, paper, cloth or other materials.

Tests indicate a degree of toxicity and skin irratation far below that of mercurials, a fact that widens their area of usefulness.

The urethanes may be applied on or incorporated into compositions that must withstand attack by a varied fungus population. These compounds are extremely potent against the three major fungal organisms: aspergillus niger, pullalaria pullulans, and alternaria sp., and are comparable therefore to mercurials in their effectiveness against a wide range of fungi.

These compounds may, of course, be applied to surfaces in various ways — incorporated into a coating or composition, applied as a dust by mixing with powdered diluents, dissolved in a solvent, or emulsified into water and then dispersed into a non-solvent. The particular application desired will generally dictate the method of use.

The percentage of active compound necessary to achieve the desired result will vary somewhat depending on the compound used, the substrate to be protected, the conditions for fungal growth, and the amount of protection desired. However, the concentrations generally range from 0.01% up to 4% in the composition applied. When R is $C_6$ or lower grouping the usual levels of usage range between 0.05 and 2%.

It is to be understood that the examples set forth below are intended to be illustrative only, and it is in no way intended to limit the invention in any way specifically thereto.

The above general preparative procedure, where applicable, is followed, using the intermediates indicated in the Examples below.

EXAMPLE I

With 3-hydroxy 1-iodopropyne (m.p. 43°–44°C.), urethanes were prepared, using the following isocyanates. The urethanes were purified by recrystallization from the indicated solvent. The percentage of iodine was determined to identify each urethane product.

| Isocyanate | | State of Product | Purification Solvent | M.P. (°C.) | % Idoine |
|---|---|---|---|---|---|
| 1 | Methyl | solid | — | 52°–56° | 53.5 |
| 2 | Butyl | solid | Butanol + Pet. ether | 65°–67° | 45.4 |
| 3. | Cyclohexyl | solid | Methanol | 118°–120° | 41.3 |
| 4. | Phenyl | solid | Methanol | 143°–146° | 42.39 |
| 5. | Hexamethylene diisocyanate | mixed solids | Ether | 113°–116° (1 fraction) | 47.7 |
| 6. | Octadecyl | solid | Methanol | 73°–75° | 26.75 |
| 7. | t-butyl | solid | Methanol | 80°–84° | 45.4 |
| 8. | Allyl | dark liquid | — | — | 48.0 |
| 9. | Dodecyl | solid | Methanol | 54°–56° | 32.35 |
| 10. | Octyl | paste | Butanol + Pet.ether | 75°–79° | 37.85 |
| 11. | Hexyl | paste | Butanol + Pet.ether | 30°–33° | 41.33 |

Toxicity studies have been carried out on the 3-hydroxy-1-iodopropyne compound 1 of Example I above (the butyl derivative). It was found to have an LD50 of 1.58 g. per kilogram. The compound exhibited no dermal toxicity and is not a primary irritant.

The chemical structures of all the urethanes described in Example I (1–11) above are within the generic structure of the invention and these compounds and their uses form a part of the invention.

EXAMPLE II

With 4-hydroxy-1-iodobutyne urethanes were prepared, using the following isocyanates:

| 1. Butyl | solid | Butanol + pet.ether | 54°–56° | 43.1 |
|---|---|---|---|---|
| 2. Methyl | solid | Butanol + Pet.ether | 75°–77° | 50.5 |
| 3. Hexyl | solid (waxy) | Butanol + Pet.ether | 40°–43° | 39.2 |

The structures of these compounds is also within the generic formula and they and their uses are a part of the invention.

EXAMPLE III

With 3,3-dimethyl-3-hydroxy-1-iodopropyne (m.p. 32°–34°), urethanes were prepared, using the following isocyanates

| Isocyanate | State of Product | Purification Solvent | M.P. (°C.) |
|---|---|---|---|
| 1. Methyl | paste | | |
| 2. Butyl | liquid | | |
| 3. Cyclohexyl | paste | Butanol + Pet. ether | 210°–212° |
| 4. Octadecyl | solid+paste | Methanol | 83°–85° |
| 5. t-butyl | paste | Ether | 237°–239° |
| 6. Allyl | liquid | | |
| 7. Dodecyl | paste | Butanol + Pet. ether | 104°–107° |
| 8. Octyl | paste | Pet. Ether | 75°–78° |
| 9. Hexyl | liq.+solid | Ether | 73°–76° |

It is to be noted that these urethanes are derived from a tertiary acetylenic alcohol and do not fall into the generic structure of the compounds of the invention and are not included as part of the invention and are presented for comparison purposes only.

EXAMPLE IV

With 1-bromo-3-hydroxy propyne, one urethane was prepared, using the following isocyanate:

1. Butyl     solid at 0°C.
             paste at room temperature

EXAMPLE V

With 4-hydroxy-1-bromobutyne, urethanes were prepared using the following isocyanates:

1. Butyl     liquid
2. Propyl     low melting solid (approx. 150°C.)

In the above two Examples IV and V, it is to be noted that the urethanes contain a bromo atom not an iodo atom. These bromo urethanes are not included as part of the invention and are for comparisons only.

EXAMPLE VI

With 3,3-dimethyl-3-hydroxy-1-bromopropyne, urethanes were prepared using the following isocyanates:

1. Butyl     liquid
2. Ethyl     liquid+solid
3. Propyl

These urethanes contain bromo not iodo atoms and are also derived from tertiary acetylenic alcohols. They do not constitute a part of the invention.

For testing as potential fungicides, many of the above urethane compounds were incorporated at a level of 2% into three compositions. It is to be understood that although the compositions used were paints, such compositions merely afford a convenient way of distributing the fungicide in a uniform manner in carrying out the appropriate tests. Compounds that perform well in the bioassay method detailed below can be expected to be active in other compositions. One reason for this is that the polyvinyl acetate latex system represents an aqueous system with a pH below 7, the acrylic latex system represents an aqueous system with a pH above 7 and linseed oil paint is non-aqueous system.

It is difficult for a fungicide to perform well in paints. There are very many components present which may react with and inactivate such compounds. The organisms used are quite potent. Actual experience shows for instance that many compounds useful in agriculture will not be at all useful in paints.

EXAMPLE VII

Formulations Tested

A. Polyvinyl Acetate (PVA) Latex Exterior Coating

| | Lbs. per 100 Gals. (approx.) |
|---|---|
| Anionic pigment dispersant | 10 |
| Water dispersible Lecithin | 2 |
| Ethylene glycol | 15 |
| Carbitol(diethylene glycol monoethyl ether) | 10 |
| Water | 420 |
| Hydroxyethyl cellulose | 3 |
| Defoamer | 2 |
| Titanium dioxide rutile | 225 |
| Titanium dioxide anatase | 50 |
| Aluminum silicate | 85 |
| 325 Mesh mica | 50 |
| Disperse | |
| Lecithin | 3 |
| Polyvinyl acetate latex/55% solids | 350 |

B. Acrylic Latex Exterior Coating

| | |
|---|---|
| Anionic pigment dispersant | 10 |
| Non-ionic wetting agent | 2.5 |
| Defoamer | 2 |
| Water | 230 |
| Ethylene glycol | 25 |
| Hydroxyethyl Cellulose | 3 |
| Titanium dioxide rutile | 225 |
| Titanium dioxide anatase | 25 |
| Aluminum silicate | 80 |
| Calcium Carbonate | 125 |
| Disperse | |
| Acrylic latex 47% solids | 400 |
| Defoamer | 1 |
| Ammonia (28%) | 10 |

C. Lead Free Linseed Oil House Paint

| | |
|---|---|
| Micronized castor wax (anti-settling agent) | 5 |
| Titanium dioxide rutile | 300 |
| Aluminum silicate | 300 |
| Bodied linseed oil | 225 |
| 3-Roll Mill | |
| Alkali refined linseed oil | 75 |
| 25% Phthalic anhydride-soya alkyd resin 60% solids | 75 |
| Mineral spirits | 195 |
| Cobalt naphthenate drier 6% | 3 |
| Calcium naphthenate drier 4% | 9 |

Test Method for the Determination of Mildew Resistance in Paint Films Procedure:

1. A brush coat of the paint to be tested is applied to one side of a Whatman No. 1 filter paper sheet.

2. To improve paint distribution, the coat is applied by first brushing along the length of the sheet, then brushing perpendicularly along the width of the sheet, and then finally along the length of the sheet again.

3. Sufficient time, usually 24 hours, is allowed for the coat to dry, whereupon a second coat is applied as applied above.

4. All systems: After thorough drying of the second coat, a portion of the sheet is cut into 1 ¼ inch squares.

5. Using accepted aseptic microbiological technique, the squares are instantaneously dipped in boiling water to surface sterilize the coating. The sterilized squares are then immediately placed, painted side up, into the center of petri dishes containing solidified Malt Agar which have been seeded by evenly distributing a 1 ml. suspension of the test fungus, *Pullularia pullulans*, or *Alternarie sp.*, as a test fungus.

6. Three replicates of each sample to be tested are used.

7. After the squares have been placed in petri dishes, they are "top inoculated" with a diluted suspension of the test fungus.

8. Incubation is at 28°C. at approximately 90% relative humidity, for a period of three weeks.

9. Observations are recorded weekly during the three week incubation period.

10. Performance ratings of compounds in the test are reported in accordance with the following legend:

Z = Zone of inhibition of growth of test fungus around sample.
O = No fungal growth on sample — paint chip clear.
2 = Very slight fungal growth on sample
4 = Slight fungal growth on sample
6 = Moderate fungal growth on sample
8 = Moderately heavy fungal growth on sample
10 = Heavy fungal growth on sample (no effect) (failure)

RESULTS OF BIOASSAY TESTS

| Fungicide | | PVA (A) Alt. | PVA (A) Pull. | Acrylic (B) Alt. | Acrylic (B) Pull. | Linseed Oil (C) Alt. | Linseed Oil (C) Pull. |
|---|---|---|---|---|---|---|---|
| None(Control) | | 10 | 8 | 10 | 6 | 10 | 8 |
| Phenyl Mercury Control | | Z | Z | Z | Z | Z | Z |
| Example | I-1 | Z | Z | Z | Z | Z | Z |
| | I-2 | Z | Z | Z | Z | Z | Z |
| | I-3 | O | Z | O | Z | Z | O |
| | I-4 | Z | Z | O | O | O | O |
| | I-5 | Z | 2 | O | O | O | O |
| | I-6 | 10 | 4 | 10 | 2 | 6 | O |
| | I-7 | Z | Z | Z | Z | Z | Z |
| | I-8 | Z | Z | Z | Z | Z | Z |
| | I-9 | 10 | 2 | 10 | 6 | 6 | O |
| | I-10 | 2 | O | O | O | 8 | O |
| | I-11 | Z | Z | O | Z | Z | Z |
| | II-1 | Z | Z | Z | Z | O | O |
| | II-2 | Z | Z | Z | Z | 10 | 4 |
| | II-3 | O | O | O | O | 10 | 4 |
| | III-1 | 4 | 10 | 10 | 6 | 10 | 8 |
| | III-2 | 4 | 10 | 10 | 6 | 6 | 8 |
| | III-3 | 4 | 10 | 10 | 6 | 10 | O |
| | III-4 | 4 | 10 | 10 | 6 | 10 | O |
| | III-5 | 2 | 10 | 4 | O | 10 | O |
| | III-6 | 10 | 2 | 10 | 6 | 10 | 10 |
| | III-7 | 10 | 4 | 10 | 6 | 10 | 10 |
| | III-8 | 10 | 4 | 10 | 2 | 10 | 10 |
| | IV-1 | 10 | 10 | 8 | 2 | 10 | 8 |

RESULTS OF BIOASSAY TESTS-continued

| Fungicide | PVA (A) Alt. | PVA (A) Pull. | Acrylic (B) Alt. | Acrylic (B) Pull. | Linseed Oil (C) Alt. | Linseed Oil (C) Pull. |
|---|---|---|---|---|---|---|
| V-1 | 10 | 10 | 10 | Z | 10 | 10 |
| V-2 | 10 | 8 | 10 | 4 | 10 | 10 |
| V-3 | 10 | 8 | 10 | 4 | 10 | 10 |
| VI-1 | 10 | 10 | 10 | 2 | 10 | 10 |
| VI-2 | 10 | 8 | 10 | 2 | 10 | 10 |

It is to be noted from the above experimental and comparative bioassay tests that the urethane compounds disclosed in Examples I and II as a part of the invention are very effective when incorporated into all three of the surface coating compositions and tested against the two test fungi.

On the other hand, the urethane compounds of Examples III, IV, V, and VI which are not included as a part of the invention, show much less effective results on the test scale when incorporated into the test surface coating compositions and tested in the assay tests against the two experimental fungi.

Thus, it is clearly seen that the urethanes derived from tertiary acetylenic alcohols are not as effective as fungicides as are the urethanes from the primary acetylenic alcohols. Also the bromo substituted urethanes are much less effective than are the iodo substituted urethanes.

What is claimed is:

1. Compounds of the formula

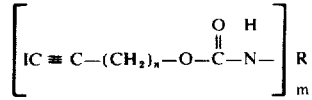

in which R is an alkyl group having one to not more than 20 carbon atoms and having from one to three linkages corresponding to $m$ and $n$ and $m$ are whole number integers between 1 and 3 and may be the same or different.

2. The compounds having the formula of claim 1 in which $m$ is 1.

3. The compounds having the formula of claim 1 in which $m$ is 2.

4. Butyl urethane of 3 hydroxy-1-iodopropyne.
5. t-Butyl urethane of 3 hydroxy-1-iodopropyne.
6. Hexyl urethane of 3 hydroxy-1-iodopropyne.
7. Methyl urethane of 3-hydroxy-1-iodopropyne.
8. The ethyl and propyl urethanes of 3-hydroxy-1-iodopropyne.
9. Butyl urethane of 4-hydroxy-1-iodopropyne.
10. Methyl urethane of 4-hydroxy-1-iodopropyne.
11. Butyl urethane of 4-hydroxy-1-iodopropyne.

* * * * *